United States Patent
Munir et al.

(10) Patent No.: US 11,261,727 B2
(45) Date of Patent: Mar. 1, 2022

(54) RESERVOIR LOGGING AND PRESSURE MEASUREMENT FOR MULTI-RESERVOIR WELLS

(71) Applicant: Saudi Arabian Oil Company, Dhahran (SA)

(72) Inventors: Muhammad Munir, Dhahran (SA); Nawaf I. SayedAkram, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 78 days.

(21) Appl. No.: 16/787,676

(22) Filed: Feb. 11, 2020

(65) Prior Publication Data

US 2021/0246780 A1    Aug. 12, 2021

(51) Int. Cl.
  *E21B 47/06* (2012.01)
  *E21B 33/124* (2006.01)
  *E21B 47/12* (2012.01)

(52) U.S. Cl.
  CPC ............ *E21B 47/06* (2013.01); *E21B 33/124* (2013.01); *E21B 47/12* (2013.01)

(58) Field of Classification Search
  CPC ........ E21B 47/06; E21B 47/12; E21B 33/124; E21B 47/07; E21B 47/125; E21B 33/1243
  See application file for complete search history.

(56) References Cited

U.S. PATENT DOCUMENTS

| | | | |
|---|---|---|---|
| 5,533,573 A | 7/1996 | Jordan, Jr. et al. | |
| 6,012,015 A * | 1/2000 | Tubel | E21B 43/14 |
| | | | 702/6 |
| 8,430,162 B2 | 4/2013 | Kotsonis et al. | |
| 9,228,427 B2 | 1/2016 | Al-Ajmi | |
| 9,494,003 B1 * | 11/2016 | Carr | E21B 34/12 |
| 9,540,921 B2 | 1/2017 | Al-Ajaji et al. | |
| 2002/0018149 A1 * | 2/2002 | Kanayama | G02F 1/13458 |
| | | | 349/1 |
| 2007/0193740 A1 | 8/2007 | Quint | |
| 2011/0067871 A1 | 3/2011 | Burdette et al. | |
| 2011/0087471 A1 | 4/2011 | Postl et al. | |
| 2018/0119533 A1 | 5/2018 | Alhuthali et al. | |

FOREIGN PATENT DOCUMENTS

| | | | |
|---|---|---|---|
| EP | 0656460 B1 | 2/2002 | |
| WO | WO 199429562 | 12/1994 | |
| WO | WO 200116457 | 3/2001 | |
| WO | WO 2009148723 | 12/2009 | |
| WO | WO 2015060846 | 4/2015 | |
| WO | WO-2015060846 A1 * | 4/2015 | ............ E21B 17/02 |
| WO | WO 2017061979 | 4/2017 | |

(Continued)

OTHER PUBLICATIONS

PCT International Search Report in International Appln. No. PCT/US2021/016458, dated Apr. 25, 2021, 14 pages.

(Continued)

*Primary Examiner* — Caroline N Butcher
(74) *Attorney, Agent, or Firm* — Fish & Richardson P.C.

(57) ABSTRACT

A system and method for monitoring a subterranean formation including conducting openhole saturation logging, via a single wellbore, of both an upper reservoir of hydrocarbon and a lower reservoir of hydrocarbon.

8 Claims, 3 Drawing Sheets

(56) References Cited

FOREIGN PATENT DOCUMENTS

WO    WO 2019182764    9/2019

OTHER PUBLICATIONS

Jacob et al., "Improving Completion Reliability by Integrating ESPs, Intelligent Completion and Zonal Downhold Monitoring Using a Compact Horizontal Wellhead," IPTC-2021-MS, Jan. 2020, XP055795258, 12 pages.

Ariwodo et al, "Reservoir Saturation Monitoring in Saudi-Aramco; Benefits, Challenges and Opportunities," SPE-126038-MS, Presented at the SPE Saudi Arabia Section Technical Symposium, Al-Khobar, Saudi Arabia, May 9-11, 2009; Society of Petroleum Engineers, 2009, 6 pages.

Azari et al, "A Newly Designed Electronic Memory Gauge Improves Reservoir Characterization," SPE 78279, Presented at the European Petroleum Conference, Aberdeen, United Kingdom, Oct. 29-31, 2002; Society of Petroleum Engineers, 2002, 12 pages.

Azari et al, "A Newly Designed Electronic Memory Gauge Improves Reservoir Characterization," Presented at the Petroleum Society of Canada, Canadian International Petroleum Conference, Jun. 11-13, 2002, Calgary, Alberta; Petroleum Society, Canadian Institute of Mining, Metallurgy, and Petroleum, 2002, 14 pages.

Edwards et al, "Technologies for Monitoring Matrix Oil Saturation for TA-GOGD," SPE 160843, Presented at the SPE Saudi Arabia Section Technical Symposium and Exhibition, Al-Khobar, Saudi Arabia, Apr. 8-11, 2012; Society of Petroleum Engineers, 2012, 14 pages.

Fitz, "Issues with Long-Term Cased-Hole Quantitative Fluid Saturation Monitoring," Society of Petrophysicists and Well-Log Analysts, May 2005, 46(3): 199-209.

Harness et al, "Accurate Oil Saturation Determination and Monitoring in a Heavy Oil Reservoir," SPE 46245, Presented at the SPE Western Regional Meeting, Bakersfield, California, May 10-13, 1998; Society of Petroleum Engineers, 1998, 11 pages.

Wilson, "Novel Brownfield-Rejuvenation Approach Uses Near-Wellbore-Saturation Monitoring," Journal of Petroleum Technology, Jan. 2018, 70(1):49-50.

\* cited by examiner

RESERVOIR LOGGING AND PRESSURE MEASUREMENT FOR MULTI-RESERVOIR WELLS

TECHNICAL FIELD

This disclosure relates to saturation logging and pressure measurement of multiple reservoirs.

BACKGROUND

Observation wells may provide for monitoring and evaluation of a subterranean formation. Logging devices may be deployed in an observation well to measure or ascertain properties of the subterranean formation. Further, an observation well may have sensors to measure or determine properties (e.g., temperature and pressure) of the subterranean formation. A reservoir of hydrocarbon in the subterranean formation may be of particular interest. The hydrocarbon may include crude oil and natural gas.

SUMMARY

An aspect relates to a method of monitoring a subterranean formation having multiple reservoirs of hydrocarbon. The method includes conducting openhole saturation logging of an upper reservoir of hydrocarbon in the subterranean formation via a wellbore in the subterranean formation. The method includes conducting openhole saturation logging of a lower reservoir of hydrocarbon in the subterranean formation via the wellbore. The lower reservoir is separate from the upper reservoir and is at a greater depth than the upper reservoir.

Another aspect relates to a method including constructing a wellbore as an observation well in a subterranean formation. The construction of the wellbore includes: (1) forming a first cased section of the wellbore in the subterranean formation above an upper reservoir of hydrocarbon in the subterranean formation; (2) forming an upper openhole section of the wellbore below the first cased section, the upper openhole section comprising same elevation as the upper reservoir; (3) forming a second cased section of the wellbore between the upper reservoir and a lower reservoir of hydrocarbon in the subterranean formation; and (4) forming a lower openhole section of the wellbore below the second cased section. The lower openhole section has a same elevation as the lower reservoir. The lower reservoir is below and separate from the upper reservoir.

Yet another aspect relates to a method including constructing a wellbore for an observation well in a subterranean formation to conduct openhole saturation logging of an upper reservoir of hydrocarbon in the subterranean formation via the wellbore and to conduct openhole saturation logging of a lower reservoir of hydrocarbon in the subterranean formation via the wellbore. The lower reservoir is below and separate from the upper reservoir. The constructing of the wellbore includes forming a first cemented-cased section of the wellbore in a first non-reservoir section of the subterranean formation. The first non-reservoir section is above the upper reservoir. The constructing includes forming an upper openhole section of the wellbore below the first cemented-cased section. The upper openhole section comprising same elevation as the upper reservoir. The constructing includes forming a second cemented-cased section in a second non-reservoir section of the subterranean formation. The second non-reservoir section is between the upper reservoir and the lower reservoir. The constructing includes forming a lower openhole section of the wellbore below the second cemented-cased section. The lower openhole section has a same elevation as the lower reservoir.

Yet another aspect relates to an observation well for a subterranean formation. The subterranean formation has an upper reservoir of hydrocarbon and a lower reservoir of hydrocarbon. The observation well includes a wellbore to receive an openhole saturation log to measure openhole saturation of both the upper reservoir and the lower reservoir. The wellbore includes: (a) a first cased section above the upper reservoir; (b) an upper openhole section below the first cased section, the upper openhole section having a same elevation as the upper reservoir; (c) a second cased section between the upper reservoir and the lower reservoir, wherein the lower reservoir is below and separate from the upper reservoir; and (d) a lower openhole section below the second cased section, the lower openhole section having a same elevation as the lower reservoir.

The details of one or more implementations are set forth in the accompanying drawings and the description below. Other features and advantages will be apparent from the description and drawings, and from the claims.

DETAILED DESCRIPTION

Aspects of the present disclosure are directed to monitoring multiple reservoirs of hydrocarbon in a subterranean formation via a single wellbore. Thus, the number of observation wells in a field with multiple reservoirs may be reduced in some embodiments. Certain implementations relate to saturation logging and pressure measurement of multiple reservoirs via a single wellbore.

Aspects may be directed to well construction and completion to provide for monitoring saturation and pressure in multiple reservoirs penetrated by a single wellbore (e.g., vertical wellbore). In embodiments, openhole logs may be utilized to measure saturation of multiple reservoirs via a single wellbore. Both real-time and memory pressure gauges may be employed to measure pressure.

Well construction practices may run casing in a wellbore across the upper reservoir of a subterranean formation. This may make saturation monitoring for the upper reservoir problematic because of the interference of the casing. Moreover, practices may employ a respective dedicated observation well for each reservoir in a subterranean formation having multiple reservoirs. Such may mean that a given wellbore is employed for openhole saturation measurement of no more than one reservoir.

In contrast, embodiments herein provide for openhole saturation monitoring of multiple reservoirs via a single wellbore. In implementations, pressure monitoring for the multiple reservoirs may also be accommodated via the single wellbore. Benefits may include to (1) reduce development cost generally as a single well can be utilized for the surveillance of multiple reservoirs; (2) increase surveillance in congested Earth surface areas with constraints in securing Earth surface locations; (3) reduce cost because of less surface equipment (e.g., less wellheads and pipelines); and (4) reduce areal footprint and cost of well sites construction.

Figure 1:
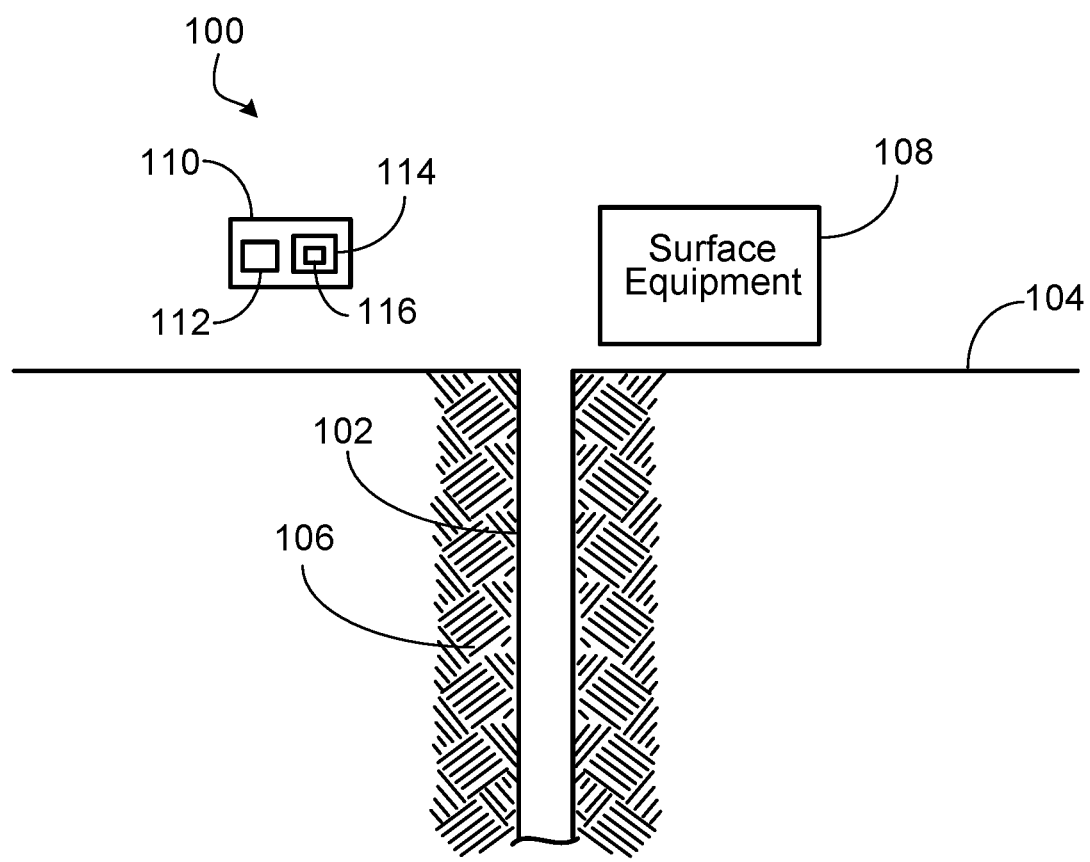
FIG. 1 is a diagram of a well site having a wellbore formed through the Earth surface into a subterranean formation in the Earth crust.

FIG. 1 is a well site 100 having a wellbore 102 formed through the Earth surface 104 into a subterranean formation 106 in the Earth crust. The wellbore 102 may be a monitoring well (e.g., observation well, evaluation well, etc.). The subterranean formation 106 may be labeled as a geological formation, a rock formation, or a hydrocarbon formation. The wellbore 102 can be vertical or deviated. The wellbore 102 may have openhole portions and cased portions. The annulus between the casing and the formation 106 may be cemented for the cased portions.

The hole diameter (borehole, openhole) of the wellbore 102 produced by a drill bit may be in a range from about 3.5 inches (8.9 centimeters) to about 30 inches (76 centimeters), or outside of this range. A borehole can have a diameter, for example, in the range of 5 inches to 30 inches. Casing in a wellbore 102 can have a nominal diameter, for example, in range of 4.5 inches to about 16 inches. The depth of the wellbore 102 can range, for example, from 1,000 feet (300 meters) to more than 30,000 feet (9,100 meters).

The subterranean formation 106 may have multiple reservoirs of hydrocarbon. The hydrocarbon may include crude oil and natural gas. The multiple reservoirs may be at different respective depths in the subterranean formation 106. In embodiments, the wellbore 102 may penetrate multiple reservoirs and may be utilized to observe and evaluate the multiple reservoirs penetrated. In some implementations, the wellbore 102 may be also utilized for production of hydrocarbon from the subterranean formation 106.

The wellbore 102 may be utilized to monitor saturation of the multiple reservoirs. Saturation may be percentage of total fluid or a particular fluid in the volume of pore space. Saturation or hydrocarbon saturation may be the percentage of pore volume filled with hydrocarbon. In implementations, water saturation or hydrocarbon (oil or oil/gas), or both, may be monitored. For fractional values of saturation, hydrocarbon or oil saturation may equal or approximately equal one minus water saturation. The pores in the reservoirs may have a mixture of water and oil (and natural gas). For undersaturated reservoirs, most or all gas may be dissolved in the oil and there may generally be little or no free gas in the reservoir, and therefore oil saturation may be characterized as one minus water saturation. For saturated reservoirs (having reservoir pressure below bubble point), there may be free gas in the reservoir so that oil saturation may be one minus the sum of water and gas saturation.

The drilling and subsequent completion to form the hole or borehole as the wellbore 102 can be to configure the wellbore 102 for evaluation or monitoring of subsurface formations including multiple reservoirs of hydrocarbon. As indicated, saturation may be measured and monitored. Embodiments provide for openhole measurements of multiple reservoirs via the single wellbore 102.

While saturation can be measured through cemented casing, such as in utilizing a carbon-oxygen log, the depth or radius of investigation for a carbon-oxygen log can be shallow compared to that of an openhole log. Thus, saturation measurement through cemented casing can be misleading because of reinvaded fluid near wellbore, and may not generally represent actual reservoir saturation.

The well site 100 may be a workplace and equipment to form and operate the wellbore 102 as a monitoring well, including to establish associated infrastructure such as a wellhead platform. Work strings including coiled or jointed tubing strings may be employed support completion and operation activities of the wellbore 102.

The well site 100 has surface equipment 108 that may include equipment to drill a borehole to form the wellbore 102. The surface equipment 108 may include a mounted drilling rig, pipeline, and storage tanks. The surface equipment 108 may include tanks, pits, pumps, and piping for circulating drilling fluid (mud) through the wellbore 102 during drilling. The surface equipment 108 at the well site 100 may include a mounted drilling rig which may be a machine that creates boreholes in the Earth subsurface. The term "rig" may refer to equipment employed to penetrate the Earth surface 104. To form a hole in the ground, a drill string having a drill bit may be lowered into the hole being drilled. In operation, the drill bit may rotate to break the rock formations to form the hole as a borehole or wellbore 102. In the rotation, the drill bit may interface with the ground or formation 106 to grind, cut, scrape, shear, crush, or fracture rock to drill the hole. The drill bit may be a component of a drill string or coupled to the drill string. The drill bit may be lowered via the drill string into the hole (borehole) or wellbore 102 to drill the wellbore 102. In operation, a drilling fluid (also known as drilling mud) is circulated down the drill string and through drill-bit nozzles. The drilling fluid may then flow upward toward the surface through an annulus formed between the drill string and the wellbore 102 wall. The drilling fluid may cool the drill bit, apply hydrostatic pressure upon the formation 106 penetrated by the wellbore 102 to prevent or reduce fluids from flowing into the wellbore 102, reduce torque and drag between the drill string and the wellbore, carry the formation cuttings to the surface, and so forth. A drill string on a drilling rig may be a column or string of drill pipe that transports drilling fluid pumped from mud pumps to the drill bit. In addition, the drill string may transmit torque via a drive to the drill bit. In certain examples, the drill string may be the assembled collection of drill pipe, drill collars, tools, and the drill bit, and the like. The drill string may be hollow so that drilling fluid can be pumped through the drill bit and ejected through nozzles of the drill bit. As mentioned, the drilling fluid may be circulated back up an annulus such as between the drill string and the openhole or casing.

After drilling a borehole or openhole, well construction and completion may involve lowering casing into openhole and cementing the casing in place. The completion may involve maintaining portions or sections of the wellbore 102 as openhole without casing. The casing as steel pipe may stabilize the wellbore 102 and form a structural component of the wellbore 102. Casing is available in a range of sizes and material grades. The casing may be per American Petroleum Institute (API) standards and specifications. Surface equipment 108 may include equipment to install and cement casing in the wellbore 102. Casing strings are generally supported by casing hangers that are set in the wellhead, Also known as setting pipe, casing a well typically involves running steel pipe (casing or casing string) down the inside of a recently drilled wellbore. Casing may be run from the rig floor, connected one joint at a time. The casing may fabricated in sections, or joints, and screwed together to form longer lengths of casing, called casing strings. In implementations, casing tongs (hanging above the drill floor) screw each casing joint to the casing string. In examples, a casing liner (called liner string or liner) may be run into the wellbore 102 instead of or in addition to a casing or a casing string. Liner is a casing string that does not extend back to the wellhead, but is hung from another casing string. A liner (liner string) may be hung in the wellbore 102 by a liner hanger, and then cemented into place.

A cement slurry may be pumped into the wellbore 102 and allowed to harden to fix the casing in place. The surface equipment 108 may include a vessel(s) to prepare and store the cement slurry. The surface equipment 108 may include a centrifugal pump to pump the cement slurry downward through the casing. The cement slurry exits the bottom of the casing and flows upward in the annulus between the casing and the formation 106 surface (wellbore 102 wall). The space between the casing and the untreated sides of the wellbore may be filled with the cement to set the casing in place. Sometimes the well is drilled in stages called a casing program. In implementations, the wellbore 102 may be drilled to a certain depth, cased and cemented, and then the wellbore 102 drilled to a deeper depth, cased and cemented again, and so on. Each time the wellbore 102 is cased, a smaller diameter casing may be used in some examples. In all, casing may be lowered into the wellbore 102 and cement slurry applied to the annulus between the casing and the openhole wall of the wellbore 102. Wellbore cementing may include mixing a slurry of cement and water, and pumping the slurry down the wellbore 102 casing, tubing, or drill pipe to a specified elevation or volume in the well. Primary cementing may involve casing cementation. In particular, primary cementing may be the cementing that takes place soon after the lowering of the casing into the formation 106 (into an openhole portion of the wellbore 102) and may involve filling the annulus between the casing and the face of formation 106 (openhole wall of the wellbore 102) with cement. In cementing, the cement slurry may be pumped from the surface 104 down the interior of the casing and then upward from the bottom through the annulus between the casing and the formation 106. Cementing is performed by circulating a cement slurry through the inside of the casing and out into the annulus through the casing shoe at the bottom of the casing string. In particular examples after the cement is set, perforations may be formed through the casing and cement into the formation 106. If implemented, the perforations may allow both for flow of fracturing fluid into the subterranean formation 106 and for flow of produced hydrocarbon from the subterranean formation 106 into the wellbore 102.

Downhole tools may refer to tools deployed into the wellbore 102 in drilling, interventions, completions, formation 106 monitoring, production of oil and gas, and so on. Downhole tools may include logging tools (a logging device, logger, or "log") employed in wellbores 102 to perform formation 106 evaluation measurements to infer or determine properties of the formation 106 surrounding the borehole and of the fluids in the formations 106. Some downhole tools may bring samples to the well surface 104. Logging tools include electromagnet electromagnetic tools, nuclear tools, nuclear magnetic resonance (NMR) tools, and so on. A log may examine reservoir properties involving rock, sand, and fluid. Logging tools may be deployed via a rig or run into a wellbore 102, for example, on a wireline cable. The log may have a coupler (e.g., bolting, loop, clamp, cable, etc.) to connect or couple the log body to a deployment extension (e.g., wireline, slickline, coiled tubing, etc.) that lowers the log into the wellbore. The deployment extension from the Earth surface 104 at the wellbore 102 may lower or deploy the downhole tool (log) into the wellbore 102. Thus, the log may be deployed or lowered into the wellbore 102 via a wireline or coil tubing. In the wellbore 102, the log may monitor or measure properties of the formation 106 or fluid flowing through the wellbore 102. In implementations, deployment and retrieval of the log may be a rigless operation such as via wireline, slickline, coiled tubing, and the like.

A wireline may be a solid or braided wire mounted on a powered reel at the surface near the borehole or wellbore. The wireline may be an electric cable, and may be single strand or multi-strand. The wireline surface equipment may include skids (for example, self-contained skid) having the wireline reel, power supply, and associated control and connection equipment. In general in the oil and gas industry, the term wireline may refer to a cabling technology by operators to lower equipment or measurement devices into the well for well intervention, reservoir evaluation, pipe recovery, and so forth.

In the oil and gas industries, coiled tubing generally refers to a metal pipe supplied spooled on a reel. The coiled tubing may be employed for interventions in oil and gas wells. In general, a coiled-tubing operation may involve inserting a flexible steel pipe into a wellbore to convey well servicing tools and to circulate fluids. In examples, the steel coiled tubing may be constructed of strips of steel rolled and seam welded. The tubing may be flexible to be coiled onto a reel, and with diameters in the range, for example, of ¾ inch to 3½ inch, or 1 inch to 3¼ inch.

A slickline which can be up to 35,000 feet or longer may be similar to a wireline. Typically, a slickline may be a thin cable to deliver and retrieve tools downhole, whereas a wireline may more generally be an electric cable to both lower tools and transmit data. In some examples, the slickline may be wrapped around a drum on the back of a truck, and the slickline raised and lowered in the well by reeling in and out the wire hydraulically.

For rigless operation, the log may be lowered into the wellbore 102 via a deployment extension from a dispenser. A rigless operation may be a well intervention conducted with equipment and support facilities that preclude the requirement for a rig over the wellbore. Coiled tubing and wireline applications may be rigless. In one example, the deployment extension is a wireline or cable and the dispenser is a wireline truck. In another example, the deployment extension is coiled tubing and the dispenser is a coiled tubing reel. The dispenser may be a conduit dispenser, and the deployment extension a conduit such as flexible pipe or coiled tubing. The dispenser may be a wire or cable dispenser, and the deployment extension a wire or cable, and so forth. In general, the deployment extension may be a wireline, conduit, coiled tubing, slickline, and the like, for rigless deployment including lowering the log into the wellbore 102 and raising or pulling (retrieving) the log from the wellbore 102.

The log may include a processor (a computer hardware processor) to facilitate operation, measurements, storing or transmission of measured data, and so forth. The log may include memory storing code (e.g., logic, instructions, etc.) executed by the processor to perform or direct actions of the log. The processor may be one or more processors, and may have one or more cores. The hardware processor(s) may include a microprocessor, a central processing unit (CPU), graphic processing unit (GPU), controller card, circuit board, or other circuitry. The memory may include volatile memory (for example, cache or random access memory), nonvolatile memory (for example, hard drive, solid-state drive, or read-only memory), and firmware.

The log may include or interface with a telemetry system which may be an automated communications system by which measurements and other data collected by the log are transmitted to remote receiving equipment for monitoring, data storage, analysis, and alerts or alarms. Data including measurement data and other data may also be stored locally in memory of the log. The telemetry system may employ wireless data transfer (for example, radio, ultrasonic, or infrared systems) and data transfer over other media. Other media may include telephone or computer network, optical link or other wired communications, Global System for Mobile (GSM) communications, or short message service (SMS). The telemetry system may convert measurements recorded by log (for example, as a wireline) into a form for transmission to the surface 104. In the case of wireline logging, the measurements may be converted, for example, into electronic pulses or analog signals that are sent up the cable.

The log may typically have a body. The body may be a metal body or metal housing and may be generally cylindrical in shape in certain embodiments. The wellbore 102 may be borehole (openhole) or a cased wellbore. A borehole can have a diameter, for example, in the range of 5 inches to 30 inches. Casing in a wellbore can have a nominal diameter as small as 4.5 inches. Thus, the outer diameter of the body 318 can be less than 4.5 inches.

The well site 100 may include a control system 110 that facilitates or directs surface equipment 108, monitoring or observation operations, logging operations, data storage or transmission, and so on. The control system 110 includes a processor 112 and memory 114 storing code 116 (logic, instructions) executed by the processor 112 to perform calculations and direct operations at the well site 100. The processor 112 may be one or more processors and each processor may have one or more cores. The hardware processor(s) 112 may include a microprocessor, CPU, GPU, controller card, or other circuitry. The memory may include volatile memory (for example, cache and RAM), nonvolatile memory (for example, hard drive, solid-state drive, and ROM), and firmware. The control system 110 may include a desktop computer, laptop computer, computer server, programmable logic controller (PLC), distributed computing system (DSC), controllers, actuators, or control cards. In operation, the control system 110 may facilitate processes at the well site 100 and including to direct operation of aspects of monitoring and logging. The control system 110 may be communicatively coupled to a remote computing system that performs calculations and provides direction. The control system 110 may receive user input or remote-computer input that specifies the set points of control devices or other control components in the surface equipment 108. In some implementations, the control system 110 may calculate or otherwise determine the set point of the control device.

In some implementations, the control system 110 may receive and stored data from logs (deployed and retrieved from the wellbore 102), downhole real-time sensors or memory gauges (e.g., for pressure or temperature) associated with the wellbore 102, and the like. The control system 110 may interface with a permanent downhole monitoring system (PDHMS) in the wellbore 102. The control system 110 may transmit date to remote computers away from the well site 100. The control system may include or interface with a supervisory control and data acquisition (SCADA) system.

Some well construction practices run casing across the upper reservoir, which makes saturation monitoring for the upper reservoir problematic because the logging signal goes through tubing, fluid, and the casing before reaching the formation 106. To implement openhole logging capability for saturation in those construction practices, dedicated wells may be targeted respectively for different reservoirs.

In contrast, embodiments herein give a completion architecture for openhole saturation logging and pressure monitoring for multiple reservoirs via a single wellbore 102. Embodiments of the present techniques may construct and complete a well to provide to periodically monitor saturation and pressure changes in multiple reservoirs penetrated by a single wellbore 102 (e.g., vertical wellbore) using openhole logs for saturation, and real-time and memory pressure gauges for pressure. In certain implementations with the present well construction, reservoir pressure data for an upper reservoir in the formation 106 may be continually (or substantially continuously) recorded. This pressure data may be transmitted, for example, to a surface local system or remote system, such as a SCADA system, intelligent field (i-field) applications system, and the like Pressure data for a deeper formation reservoir may be continuously (or substantially continuously) recorded on memory gauges. In examples, the memory pressure gauges can be retrieved (e.g., via a slickline), such as quarterly or bi-annually, to download the data and re-run the gauges.

Figure 2:
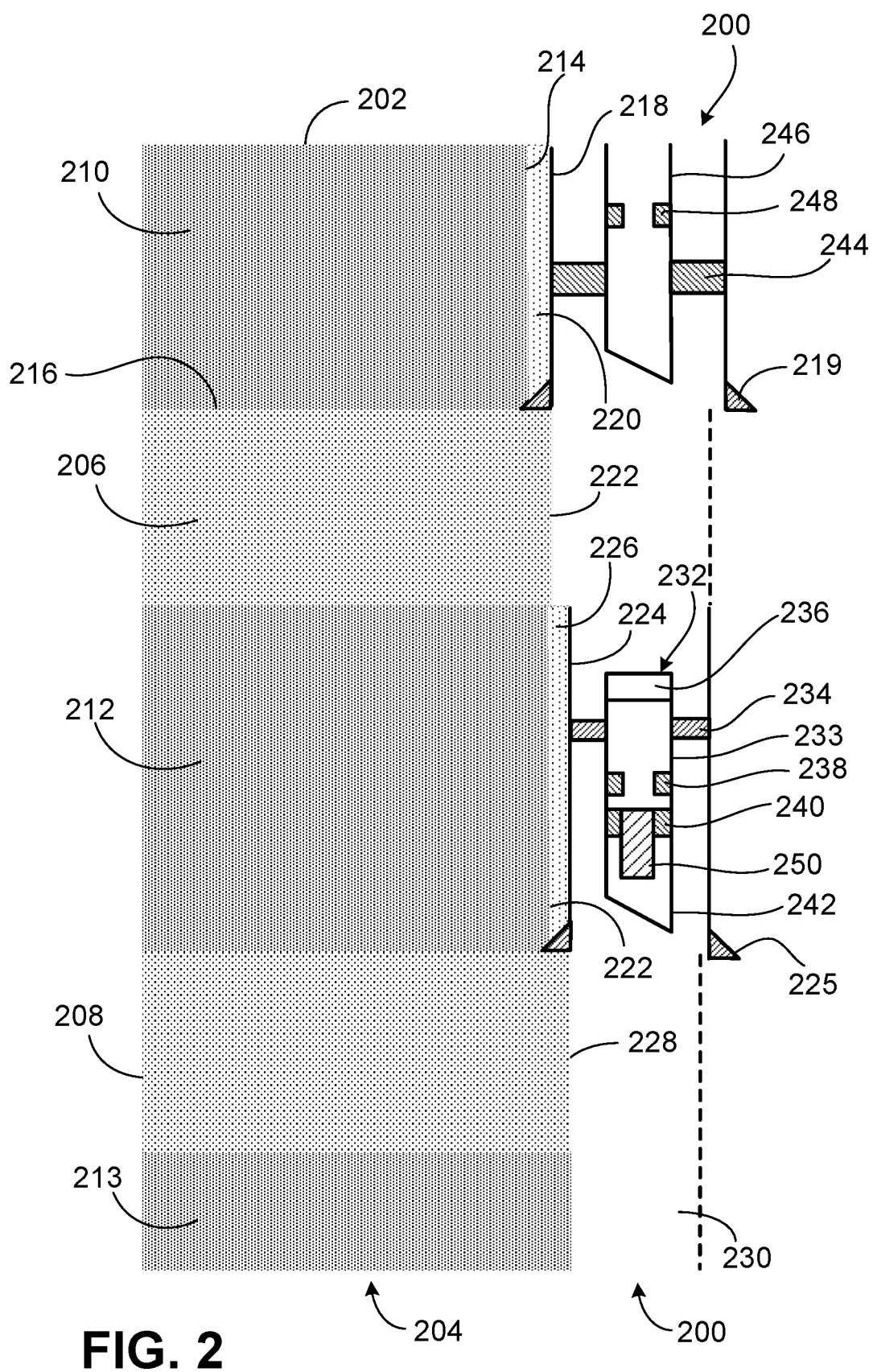
FIG. 2 is a diagram of a wellbore that may be the wellbore of FIG. 1.

FIG. 2 is a wellbore 200 formed through the Earth surface 202 into a subterranean formation 204. For clarity, only the part of the formation 204 to the left of the wellbore 200 is depicted. The subterranean formation 204 includes at least two reservoirs 206, 208 of hydrocarbon. The hydrocarbon may include crude oil and natural gas. A reservoir may be labeled as a hydrocarbon reservoir or hydrocarbon formation. For a subterranean formation having multiple reservoirs of hydrocarbon, the reservoirs may be labeled as hydrocarbon zones or hydrocarbon layers.

In the illustrated embodiment, the subterranean formation 204 has an upper reservoir 206 of hydrocarbon and a lower reservoir 208 of hydrocarbon. The lower reservoir 208 is deeper (at a greater depth) than the upper reservoir 206.

The formation 204 between the Earth surface 202 and the upper reservoir 206 may be characterized as a non-reservoir section or first non-reservoir 210. The formation 204 between the upper reservoir 206 and the lower reservoir 208 may be characterized as a non-reservoir section or second non-reservoir 212. A non-reservoir section may include rock and have little or no hydrocarbon. The subterranean formation 204 may also have a non-reservoir section 213 below the lower reservoir 208. The formation 204 may have one or more additional reservoirs of hydrocarbon below the non-reservoir section 213.

The wellbore 200 may be constructed as an observation well (an observation wellbore) in the subterranean formation 204. This construction may include forming in the wellbore 200: (a) a first cased section above the upper reservoir 206; (b) an upper openhole section at the depth of the upper reservoir 206; (c) a second cased section between the upper reservoir 206 and the lower reservoir 208; and (d) a lower openhole section at the elevation of the lower reservoir 208. In operation, an openhole saturation log may be deployed into the wellbore 200 to measure saturation of the upper reservoir 206 at the upper openhole section and to measure saturation of the lower reservoir 208 at the lower openhole section.

Examples of the saturation log for openhole measurement of saturation of the reservoirs 206, 208 may include a slim array induction tool (SAIT) and in which the Archie equation may be employed and saturation generally estimated from geological formation resistivity. The saturation log may measure formation resistivity. The saturation measured may be hydrocarbon saturation or total fluid (e.g., hydrocarbon+water) saturation. Water saturation can be derived from this resistivity utilizing the Archie equation. Hydrocarbon saturation can be specified as 1 minus water saturation. In embodiments, the saturation log may distinguish between hydrocarbon and water based on resistivity.

The saturation log may be retrieved from the wellbore 200. As discussed below, the wellbore 200 may be completed to provide for measuring pressure of the upper reservoir 206 in real time via pressure sensors and measuring pressure of the lower reservoir 208 via memory pressure gauges. The completions associated with measuring pressure of the lower reservoir 208 may be removed to give access for subsequent openhole saturation monitoring of the lower reservoir 208 via the saturation log.

For forming the first cased section, the well construction for the wellbore 200 may include drilling a borehole or hole 214 (openhole) from the Earth surface 202 into the first non-reservoir section 212 to about the top 216 of the upper reservoir 206. In examples, the diameter of the hole 214 (openhole) is at least 12¼". A casing 218 having a nominal diameter less than hole 214 may then be run (installed) and cemented across the hole 214. In examples, the nominal outside diameter (OD) of the casing is at least 9⅝". The casing 218 may be cemented with cement 220 set in the annulus between the casing 218 and the formation 204 (formation face at the borehole 214 wall). A production casing shoe 219 may be attached at the end of the casing 218. The production casing shoe 219 may be a bull-nose shaped device and can be called a guide shoe. In implementations, after this first cased section (having the casing 218) is formed, the well construction may proceed as described below.

The wellbore 200 construction may include to clean out and drill a hole 222 through the upper reservoir 206 and the non-reservoir section 212 below the upper reservoir 206. The hole 222 may have a diameter less than above hole 214 and less than the above casing 218 in some instances. In examples, the diameter of the hole 222 may be at least 8½". The hole 222 (borehole) across the upper reservoir 206 may be left as openhole (to provide for openhole saturation measurement of the upper reservoir 206). The hole 222 across the upper reservoir 206 may be the upper openhole section of the wellbore 200. In operation of the monitoring (observation) wellbore 200, the techniques may include to conduct openhole saturation logging of the upper reservoir 206 at the openhole 222 at the upper reservoir 206. The openhole logging for the upper reservoir 206 may include deploying the logging device or log to measure saturation of the upper reservoir 206 and then retrieving (removing) the logging device from the wellbore 200 to the surface 202.

An exemplary construction (completion) for the wellbore 200 may include to run (install) a liner 224 (casing liner) across the non-reservoir section 212 (at the wall of the hole 222) below the upper reservoir 206, and then to cement the liner 224. The situated liner 224 may be cemented (cement 226) to give the second cased section (having the liner 224 as casing) of the wellbore 200. A liner shoe 225 may be attached at the end of the liner 224. The liner 224 has a nominal diameter less than the diameter of the hole 222. In some implementations, the liner 224 has a nominal diameter of 7" or less.

In the illustrated embodiment, the wellbore 200 construction may proceed to drill a hole 226 through lower reservoir 208 and into the non-reservoir section 213 below the lower reservoir 208. The hole 226 has a diameter less than the above hole 222. The hole 226 may generally have a diameter less than the nominal diameter of the liner 224. In one implementation, the hole 226 has a diameter of 6⅛" or less.

The hole 226 may be left as openhole across the lower reservoir 208 to accommodate openhole saturation monitoring of the lower reservoir 208. This hole 226 at the lower reservoir 208 may be the aforementioned lower openhole section of the wellbore 200. In the operation of the wellbore 200 as an observation or evaluation well, embodiments may conduct openhole saturation logging for the lower reservoir 208.

The hole 226 below the lower reservoir 208 in the non-reservoir section 213 may remain as openhole to provide, for example, a rat hole 230. In one instance, the rat hole 230 is less than 150 feet in length. In completion or operation of the wellbore 200, the rat hole 230 may collect debris (if any) that falls down in the wellbore 200. The rat hole 230 may also provide extension space for logging tools so that the full depth of the lower reservoir 208 can be logged.

At the conclusion of a round (iteration) of openhole saturation logging of the lower reservoir 208, the openhole saturation log may be removed and the wellbore 200 completion may run (install) an assembly 232 (e.g., tail assembly) to the liner 224. In embodiments, the tail assembly may generally remain in the wellbore. In operation, an isolation or blanking plug (e.g., associated with the tail assembly 232) may be removed prior to running the saturation log and set again after completion of running the saturation log.

The assembly 232 or components of the assembly 232 may be retrievable (removable) from the wellbore 200. The assembly 232 may be tubing 233 with the following completion jewelry: (1) packer 234 (e.g., isolation packer) to provide inter-reservoir isolation; (2) junk basket 236 to protect completion components from junk; (3) nipple profile 238 to set an isolation plug or blanking plug; (4) a nipple profile 240 to hang memory gauges; and (5) a wireline re-entry guide 242. The tubing 233 and packer 234 both are part of the tail assembly 232 and, in embodiments, can generally remain in the wellbore 200 during normal operation. The packer 234 is outside of the tubing 233 and thus does not impact access of the saturation log. In embodiments, the tail assembly 232 is not removed.

The inner diameter (ID) of the tubing 233 may be considered full-bore access. The restriction may be the nipple profile 238 (for the isolation plug or blanking plug). However the ID of the nipple profile 238 can generally be adequate (large enough) to allow access for a logging tool such as a saturation log.

The junk basket 236 may be on an upper portion of the assembly 232. In operation, the junk basket 236 may collect junk, such as from above the assembly 232. Junk may include objects fallen into or lost in the wellbore 200. Junk may include debris (e.g., metal debris), stray equipment, lost bit, pieces of a bit, bit cones, pieces of pipe, tools (e.g., hand tools, such as wrenches), or other small objects that may impede completion.

The packer 234 may facilitate to isolate the upper openhole portion of the wellbore 200 associated with the upper reservoir 206 from the lower openhole portion of the wellbore 200 associated with the lower reservoir 208. The packer 234 (e.g., along with the isolation plug or blanking plug on the nipple profile 238) may isolate exposure of the upper reservoir 206 to the wellbore 200 from exposure of the lower reservoir 208 to the wellbore 200. The packer 234 may assist pressure isolation in the wellbore 200 between the upper reservoir 206 and the lower reservoir 208. Thus, the packer 234 may facilitate independent pressure measurement of the upper reservoir 206 and the lower reservoir 208. The isolation plug or blanking plug set on the nipple profile 238 may also facilitate pressure isolation between the upper reservoir 206 and the lower reservoir 208.

Further, certain embodiments may run an upper completion in the casing 218 of the first cased section (e.g., 9⅝" completion) including a cased-hole packer 244 and tubing 246 having a nipple profile 248. In embodiments, the components depicted in this upper completion may remain in the wellbore 200 through the observation operation. For instance, the cased-hole packer 244 and tubing 246 may remain in the wellbore 200 and generally do need to be removed for saturation logging. In examples, the nipple profile 248 is for installing a plug for the pressure test of the tubing 246. In embodiments, the nipple profile 248 does not stop access of the saturation log. The saturation log may be deployed through the tubing 246. The tubing 246 ID may be considered full-bore access, and with the nipple profile 248 as a restriction but wan inner diameter adequate access for most or all logging tools This upper completion may include sensors for measuring properties (e.g., pressure and temperature) (e.g., in real time) of the upper reservoir 206. For instance, this upper completion may be run with PDHMS having the pressure sensors (and temperature sensors). The PDHMS system may consist of pressure and temperature sensors installed as part of the completion. The PDHMS may include a data cable to power up sensors (gauges) and transmit data to the surface 202 and a surface panel to display data and/or further transmit data. The PDHMS sensors or gauges may be fixed on the outer surface of the tubing 246 inside the cemented casing 218. The PDHMS may transmit data to a SCADA system or i-filed applications system.

As for the lower completion, memory gauges 250 may be programmed at the surface 202 for a desired measurement frequency and then run in hole and set on the nipple profile 240. The memory gauges 250 may be situated below the packer 234. The memory gauges 250 may include one or more memory pressure gauges. The memory gauges 250 may include temperature gauges. The memory gauges 250 when deployed with the assembly 232 may measure properties (e.g., pressure or temperature) of the lower reservoir 208. The measurements may be substantially continuously, or at a specified or programmed frequency. The memory gauges 250 may have memory to store measured data. For instance, the memory pressure gauges may store values, e.g., in bar or pounds per square inch gauge (psig), of pressure measured of the lower reservoir 208. The lower reservoir 208 may exert pressure on the wellbore 200, which is measured by the memory pressure gauges.

A run may be performed to install a blanking plug in the nipple profile 238 above memory gauges 250 to provide isolation. The blanking plug may provide for pressure isolation inside the tubing 233. The blanking plug and the packer 238 (for inter reservoir isolation) on the tail assembly 232 may provide for isolation so that the upper reservoir 206 pressure and deeper reservoir 208 pressure can be measured independent of each other The pressure and temperature of the upper reservoir 206 may continue to be monitor in real time via the pressure sensor(s) and temperature sensor(s), respectively, in the upper completion (e.g., in the PDHMS). Openhole saturation monitoring (via a saturation log) of the upper reservoir 206 may be performed periodically. Openhole saturation monitoring (measurements) of the upper reservoir 206 may be performed while the memory gauges 250 collect pressure data of the lower reservoir 208 and while the real-time sensors collect pressure data of the upper reservoir 206. The openhole saturation log (logging device) can be lowered to measure saturation of the deeper reservoir 208 but the memory gauges should first be out of hole to provide full-bore access for the logging device.

When and if needed, embodiments may run in hole a wireline and retrieve, via the wireline, the junk basket 236, blanking plug, and memory gauges 250. Such removal may be implemented, for example, when desired have generally full-bore access for deploying an openhole log to measure saturation of the lower reservoir. The memory pressure gauges 250 may be removed from the wellbore 200. In examples, the tail assembly 232 may substantially remain in the wellbore 200 during normal observation operation. Certain components, such as the junk basket 236, blanking plug, and memory gauges 250, may be removed from the wellbore 200 at certain intervals over the operation. The pressure data may be retrieved from the memory. When memory gauges are out of hole, full-bore access is available to both reservoirs 206, 208 and a log (e.g., for openhole saturation measurement) can be run. The presence of the memory pressure gauges 250 in position downhole does not impact access for the upper reservoir 206. As indicated, data from memory pressure gauges 250 can be downloaded. A new battery can be installed in the memory pressure gauges 250. The memory pressure gauges 250 can be re-programed (e.g., for measurement frequency) and rerun in-hole.

Thus, the wellbore 200 may be an observation/evaluation well. In some implementations, the wellbore 200 may be additionally be utilized for production of hydrocarbon from the subterranean formation 204. For instance, in certain embodiments, construction and operation of the wellbore 200 may allow for production from the upper reservoir 206 alone or commingled with production from the lower reservoir 208.

In summary, a wellbore may have a combination of real-time and memory gauges to record pressure data, and blanking plug(s) to provide isolation between different reservoirs. The wellbore at respective depths of multiple reservoirs may be completed openhole for openhole saturation monitoring. As discussed, other wellbores may not allow openhole saturation logging for multiple reservoirs via a single wellbore. Other practices may account for completion giving openhole saturation monitoring of a single reservoir via a single wellbore but not openhole saturating monitoring for multiple reservoirs in single well. The present techniques may facilitate to monitor periodic saturation and pressure changes in multiple reservoirs penetrated in a single vertical well utilizing openhole logs, and real time and memory pressure gauges. Embodiments may reduce construction and operation costs. In some embodiments, total well count may be reduced without compromising reservoir surveillance. The techniques may conduct openhole logging for saturation monitoring of multiple reservoirs via a single wellbore. Some implementations may reduce well count and save cost related to drilling and surface facilities. Costs may be reduced while maintaining quality saturation data for reservoir surveillance.

An embodiment is an observation well for a subterranean formation with the subterranean formation having an upper reservoir of hydrocarbon and a lower reservoir of hydrocarbon. The observation well includes a wellbore to receive an openhole saturation log to measure openhole saturation of both the upper reservoir and the lower reservoir. The wellbore includes: (1) a first cased section above the upper reservoir; (2) an upper openhole section below the first cased section, the upper openhole section having the same elevation as the upper reservoir; (3) a second cased section between the upper reservoir and the lower reservoir, wherein the lower reservoir is below and separate from the upper reservoir; and (4) a lower openhole section below the second cased section, the lower openhole section having the same elevation as the lower reservoir. In implementations, the first cased section maybe a first cemented-cased section having casing with a nominal outside diameter (OD) of at least 9⅝ inches. The upper openhole section may have a diameter of at least 8½ inches. The second cased section may be a second cemented-cased section having a casing liner with a nominal diameter of 7 inches or less. In implementations, the lower openhole section may have a diameter of 6⅛ inches or less. In certain examples, the wellbore may have a PDHMS in the first cased section. The PDHMS may have a pressure sensor to measure pressure of the upper reservoir in real time. The wellbore may have a cased-hole packer in the first cased section. The wellbore may have an assembly (e.g., tail assembly) in the second cased section. This assembly may have a memory pressure gauge to measure pressure of the lower reservoir. The assembly may include an isolation packer for inter-reservoir isolation, and wherein the memory pressure gauge is disposed below the isolation packer. The memory pressure gauge may be disposed on a nipple profile of the assembly. The assembly may have a junk basket on an upper portion of the assembly. The assembly may have a wireline re-entry guide. The assembly (e.g., tail assembly) and/or components of the assembly may be retrievable (removable from the wellbore).

Figure 3:
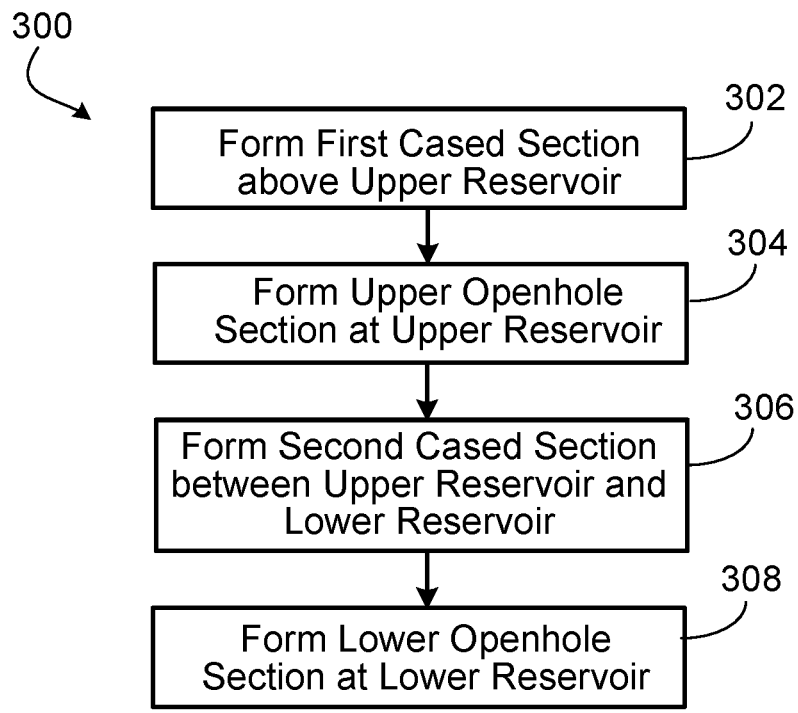
FIG. 3 is a method of constructing a wellbore as or for an observation well.

FIG. 3 is a method 300 of constructing and completing a wellbore in a subterranean formation as an observation (evaluation) well. The wellbore is constructed to provide for openhole saturation monitoring of multiple reservoirs penetrated by the wellbore.

At block 302, the method includes forming a first cased section of the wellbore above an upper reservoir of hydrocarbon in the subterranean formation. The forming of the first cased section may include: (1) drilling an openhole (e.g., at least 12¼ inches) (first diameter) in the subterranean formation above the upper reservoir; (2) installing a casing into the openhole; and (3) cementing the casing including placing cement in an annulus between the casing and the formation face of the openhole. The nominal OD (e.g., at least 9⅝ inches) of the casing is less than the openhole diameter (first diameter).

At block 304, the method includes forming an upper openhole section of the wellbore below the first cased section. The upper openhole section shares a same elevation as the upper reservoir. The forming of the upper openhole section may involve drilling an openhole (e.g., at least 8½ inches) (second diameter) in the upper reservoir. In implementations, the second diameter is less than the nominal OD of the casing in the first cased section. The wellbore is constructed to receive an openhole saturation log to measure saturation of the upper reservoir at the upper openhole section.

At block 306, the method includes forming a second cased section of the wellbore between the upper reservoir and a lower reservoir of hydrocarbon in the subterranean formation. The lower reservoir is below (deeper) and separate from the upper reservoir. The forming of the second cased section may involve drilling an openhole (second diameter) between the upper reservoir and the lower reservoir, and installing and cementing a casing liner in the openhole between the upper reservoir and lower reservoir. The second diameter is less than the first diameter. The nominal diameter (e.g., 7 inches or less) of the casing liner is less than the second diameter.

At block 308, the method includes forming the lower openhole section of the wellbore below the second cased section. The lower openhole section shares the same elevation as the lower reservoir. The forming of the lower openhole section may involve drilling an openhole (e.g., 6⅛ inches or less) (third diameter) in the lower reservoir, wherein the third diameter is less than the nominal diameter of the casing liner of the second cased section. The drilling of this openhole (third diameter) may be contemporaneous with drilling of the openhole (third diameter) for preparing the second cased section. The wellbore is constructed to receive an openhole saturation log to measure saturation of the lower reservoir at the lower openhole section.

The method 300 may include installing a cased-hole packer in the first cased section. The method may include installing a pressure sensor in the first cased section to measure pressure of the upper reservoir in real time. The installation of the pressure sensor may involve running (completing or installing) a PDHMS having the pressure sensor in the first cased section.

The method 300 may include installing an isolation packer in the second cased section. The method may include installing a memory pressure gauge in the second cased section below the isolation packer. The installation of the memory pressure gauge may involve hanging the memory pressure gauge on a nipple profile of a tail assembly deployed in the second cased section. The memory pressure gauge may be retrievable (e.g., removable via a wireline) to provide access for a saturation log through the second cased section to the lower openhole section.

An embodiment is a method including constructing a wellbore for an observation well in a subterranean formation to conduct openhole saturation logging of an upper reservoir of hydrocarbon in the subterranean formation via the wellbore and to conduct openhole saturation logging of a lower reservoir of hydrocarbon in the subterranean formation via the wellbore. The constructing of the wellbore includes: (1) forming a first cemented-cased section of the wellbore in a first non-reservoir section of the subterranean formation, wherein the first non-reservoir section is above the upper reservoir; (2) forming an upper openhole section of the wellbore below the first cemented-cased section, the upper openhole section having a same elevation as the upper reservoir; (3) forming a second cemented-cased section in a second non-reservoir section of the subterranean formation, wherein the second non-reservoir section is between the upper reservoir and the lower reservoir, and wherein the lower reservoir is below and separate from the upper reservoir; and (4) forming a lower openhole section of the wellbore below the second cemented-cased section, the lower openhole section having a same elevation as the lower reservoir. The method may include installing a cased-hole packer in the first cemented-cased section and installing an isolation packer in the second cemented-cased section. The method may include installing a PDHMS in the first cemented-cased section, the PDHMS having a pressure sensor to measure pressure of the upper reservoir in real time. The method may include installing a memory pressure gauge in the second cemented-cased section to measure pressure of the lower reservoir. The installation of the memory pressure gauge may involve deploying a tail assembly having a nipple profile to the second cemented-cased section, and setting the memory pressure gauge on the nipple profile.

Figure 4:
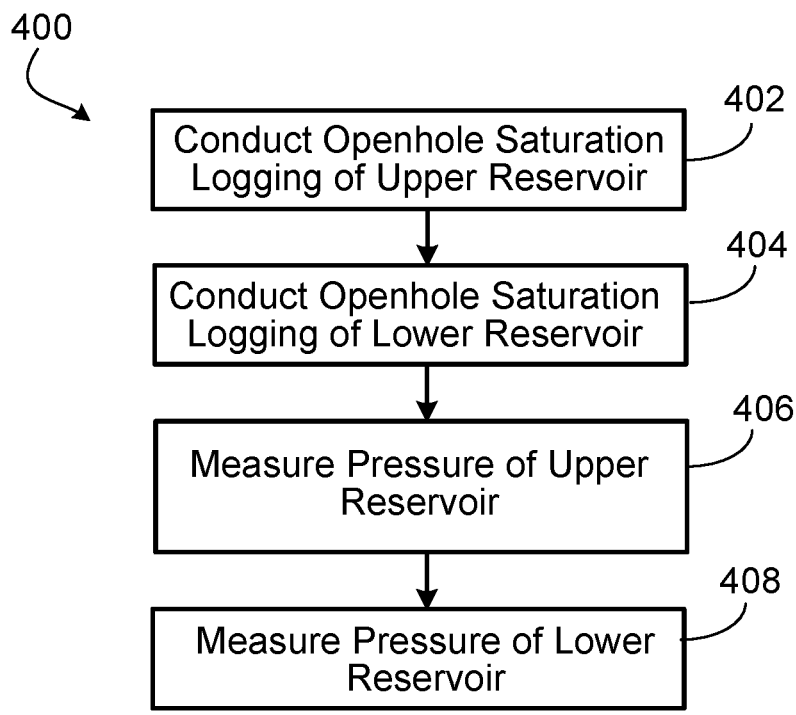
FIG. 4 is a method of monitoring or evaluating a subterranean formation having at least two reservoirs of hydrocarbon.

FIG. 4 is a method 400 of monitoring a subterranean formation having multiple reservoirs of hydrocarbon. At block 402, the method includes conducting openhole saturation logging of an upper reservoir of hydrocarbon in the subterranean formation via a wellbore in the subterranean formation. Conducting openhole saturation logging of the upper reservoir may involve deploying an openhole saturation log through a first cased portion of the wellbore to an upper openhole portion of the wellbore. The upper openhole portion is below the first cased portion and has a same elevation as the upper reservoir.

At block 404, the method includes conducting openhole saturation logging of a lower reservoir of hydrocarbon in the subterranean formation via the wellbore. The lower reservoir is separate from the upper reservoir and is at a greater depth than the upper reservoir. Conducting openhole saturation logging of the lower reservoir may involve further deploying the openhole saturation log through a second cased portion of the wellbore to a lower openhole portion of the wellbore. The second cased portion is between the upper reservoir and the lower reservoir. The lower openhole portion is generally below the second cased portion and has a same elevation as the lower reservoir.

At block 406, the method includes measuring pressure of the upper reservoir in real time via sensors in an upper completion of the wellbore. The sensors (e.g., including pressure sensor) may be components of a PDHMS in some examples. At block 408, the method includes measuring pressure of the lower reservoir via a memory pressure gauge in a lower completion of the wellbore. To facilitate pressure measurement of the upper reservoir independent from pressure measurement of the lower reservoir, the method may include disposing an isolation packer in a cased portion of the wellbore between the upper reservoir and the lower reservoir. The isolation packer may isolate the upper openhole portion of the wellbore associated with the upper reservoir from the lower openhole portion of the wellbore associated with the lower reservoir. The installation of the isolation packer may involve deploying an assembly (e.g., tail assembly) having the isolation packer into the wellbore to the cased portion. The assembly may have a nipple profile for the memory pressure gauge that measures pressure of the lower reservoir. The method may include disposing the memory pressure gauge on the nipple profile (with the memory pressure gauge positioned below the isolation packer) and measuring pressure of the lower reservoir with the memory pressure gauge. Thus, the method may include measuring pressure of the lower reservoir via a memory pressure gauge in the wellbore below an isolation packer. The measured pressure data may be stored in memory of the memory pressure gauge.

The method may include removing the memory pressure gauge from the wellbore and retrieving the pressure data from the memory. The memory pressure gauge and other components may be removed from the second cased section to allow access by an openhole saturation log through the second cased section to the lower openhole section at the lower reservoir. After performing openhole saturation logging of the lower reservoir, the saturation log may be removed from the wellbore and the memory pressure gauge (and other components) re-deployed to the second case section for measuring pressure of the lower reservoir. These iterations may be performed in cycles in some implementations.

An embodiment is a method of evaluating a subterranean formation via a wellbore of an observation well in the subterranean formation. The method includes performing openhole saturation logging of an upper reservoir of hydrocarbon in the subterranean formation via an upper openhole section of the wellbore. The method includes performing openhole saturation logging of a lower reservoir of hydrocarbon in the subterranean formation via a lower openhole section of the wellbore. The lower reservoir is below and separate from the upper reservoir. The method may include disposing an isolation packer in a cased section of the wellbore between the upper reservoir and the lower reservoir. The isolation packer may be so disposed to isolate an upper openhole portion of the wellbore associated with the upper reservoir from a lower openhole portion of the wellbore associated with the lower reservoir. The method may include measuring pressure of the upper reservoir in real time via the wellbore based on pressure exerted by the upper reservoir through the upper openhole section. The method may include deploying a memory pressure gauge into the wellbore to below the isolation packer, and measuring pressure of the lower reservoir via the memory pressure gauge based on pressure exerted by the lower reservoir through the lower openhole section. The performing of openhole saturation logging of the lower reservoir may involve removing the memory pressure gauge from the wellbore. In some examples, the disposing of the isolation packer may involve deploying an assembly having the isolation packer into the wellbore to the cased portion, and with the assembly having a nipple profile for the memory pressure gauge.

A number of implementations have been described. Nevertheless, it will be understood that various modifications may be made without departing from the spirit and scope of the disclosure.

What is claimed is:

1. A method of monitoring a subterranean formation having multiple reservoirs of hydrocarbon, comprising:
   conducting openhole saturation logging of an upper reservoir of hydrocarbon in the subterranean formation via a wellbore in the subterranean formation;
   conducting openhole saturation logging of a lower reservoir of hydrocarbon in the subterranean formation via the wellbore, wherein the lower reservoir is separate from the upper reservoir and is at a greater depth than the upper reservoir;
   measuring pressure of the lower reservoir via a memory pressure gauge in the wellbore below an isolation packer, wherein measured pressure data is stored in memory of the memory pressure gauge; and
   removing the memory pressure gauge from the wellbore and retrieving the pressure data from the memory.

2. The method of claim 1, wherein conducting openhole saturation logging of the upper reservoir comprises deploying an openhole saturation log through a first cased portion of the wellbore to an upper openhole portion of the wellbore, wherein the upper openhole portion is below the first cased portion and comprises same depth as the upper reservoir.

3. The method of claim 2, wherein conducting openhole saturation logging of the lower reservoir comprises deploying the openhole saturation log through a second cased portion of the wellbore to a lower openhole portion of the wellbore, wherein the second cased portion is below the first cased portion and is between the upper reservoir and the lower reservoir, and wherein the lower openhole portion is below the second cased portion and comprises same depth as the lower reservoir.

4. The method of claim 1, comprising measuring pressure of the upper reservoir in real time via the wellbore.

5. The method of claim 1, comprising disposing the isolation packer in a cased portion of the wellbore between the upper reservoir and the lower reservoir to isolate an upper openhole portion of the wellbore associated with the upper reservoir from a lower openhole portion of the wellbore associated with the lower reservoir.

6. The method of claim 5, wherein disposing the isolation packer comprises deploying an assembly comprising the isolation packer into the wellbore to the cased portion, the assembly comprising a nipple profile for the memory pressure gauge.

7. The method of claim 6, comprising disposing the memory pressure gauge on the nipple profile, wherein the memory pressure gauge is positioned below the isolation packer, and wherein the assembly comprises a tail assembly.

8. A method of evaluating a subterranean formation via a wellbore of an observation well in the subterranean formation, comprising:
    performing openhole saturation logging of an upper reservoir of hydrocarbon in the subterranean formation via an upper openhole section of the wellbore;
    performing openhole saturation logging of a lower reservoir of hydrocarbon in the subterranean formation via a lower openhole section of the wellbore, the lower reservoir below and separate from the upper reservoir;
    disposing an isolation packer in a cased section of the wellbore between the upper reservoir and the lower reservoir; and
    measuring pressure of the upper reservoir in real time via the wellbore based on pressure exerted by the upper reservoir through the upper openhole section;
    deploying a memory pressure gauge into the wellbore to below the isolation packer; and
    measuring pressure of the lower reservoir via the memory pressure gauge based on pressure exerted by the lower reservoir through the lower openhole section, wherein performing openhole saturation logging of the lower reservoir comprises removing the memory pressure gauge from the wellbore.

* * * * *